United States Patent
Doi (10) Patent No.: US 10,682,984 B2
(45) Date of Patent: Jun. 16, 2020

(54) WIPER CONTROL DEVICE

(71) Applicant: DENSO CORPORATION, Kariya, Aichi-pref. (JP)

(72) Inventor: Yuta Doi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/378,638

(22) Filed: Apr. 9, 2019

(65) Prior Publication Data
US 2019/0329736 A1 Oct. 31, 2019

(30) Foreign Application Priority Data

Apr. 27, 2018 (JP) .................................. 2018-087553

(51) Int. Cl.
*B60S 1/08* (2006.01)
*B60S 1/16* (2006.01)

(52) U.S. Cl.
CPC ........... *B60S 1/0822* (2013.01); *B60S 1/0896* (2013.01); *B60S 1/16* (2013.01)

(58) Field of Classification Search
CPC ...... H02P 1/00; H02P 1/04; H02P 1/46; H02P 21/50; H02P 1/16; H02P 1/18; H02P 1/22; H02P 1/24; H02P 1/26; H02P 1/265; H02P 1/28; H02P 1/40; H02P 1/423; H02P 1/465; H02P 6/00; H02P 6/002; H02P 6/003; H02P 6/04; H02P 6/08; H02P 6/12; H02P 6/24; H02P 7/00; H02P 7/06; H02P 9/00; H02P 9/107; H02P 23/00; H02P 25/00; H02P 27/00; H02P 27/04; H02P 27/06; H02P 21/0035; H02P 21/148; G05B 2219/41378; G05B 2219/42289

USPC ............... 15/236.02, 250.001; 318/635, 689, 318/400.01, 115, 119, 400.07, 400.12, 318/400.14, 400.22, 400.38, 400.37, 318/400.42, 714, 721, 725, 727, 280, 282, 318/286, 430, 432, 434, 400.15
See application file for complete search history.

(56) References Cited

U.S. PATENT DOCUMENTS 6,281,649 B1 * 8/2001 Ouellette .............. B60S 1/0416
15/250.12
10,023,152 B2 * 7/2018 Dudar ....................... H02P 1/18

FOREIGN PATENT DOCUMENTS

| JP | 2005-502545 A | 1/2005 |
| JP | 2013-514931 A | 5/2013 |
| JP | 2013-530084 A | 7/2013 |

* cited by examiner

*Primary Examiner* — Antony M Paul
(74) *Attorney, Agent, or Firm* — Oliff PLC (57) ABSTRACT

A wiper control device that includes: a current detection section that detects a flow of current through a coil of a wiper motor; an environmental information acquisition section that acquires a vehicle speed or a vehicle external air temperature as environmental information; and a control section that controls a drive circuit such that a torque of an output shaft that is estimated from the current detected by the current detection section becomes equal to or less than a base limit torque that corresponds to a rotation angle detected by a rotation angle detection section, and such that a torque of the output shaft becomes equal to or less than a base limit torque that is corrected according to environmental information acquired by the environmental information acquisition section.

3 Claims, 8 Drawing Sheets

RELATED ART

FIG.8A

TORQUE
AMPLIFICATION
BY LINK
MECHANISM [Nm]

MOTOR TORQUE
LIMIT [Nm]

SYSTEM LOAD
WHEN ARMS
ARE RESTRAINED [N]
(TORQUE/ARM
  LENGTH)

P2  P4  P1

RELATED ART

WIPER CONTROL DEVICE

CROSS-REFERENCE TO RELATED APPLICATION

This application is based on and claims priority under 35 USC 119 from Japanese Patent Application No. 2018-087553 filed on Apr. 27, 2018, the disclosure of which is incorporated by reference herein.

BACKGROUND

Technical Field

The present disclosure relates to a wiper control device.

Related Art

Figure 7:
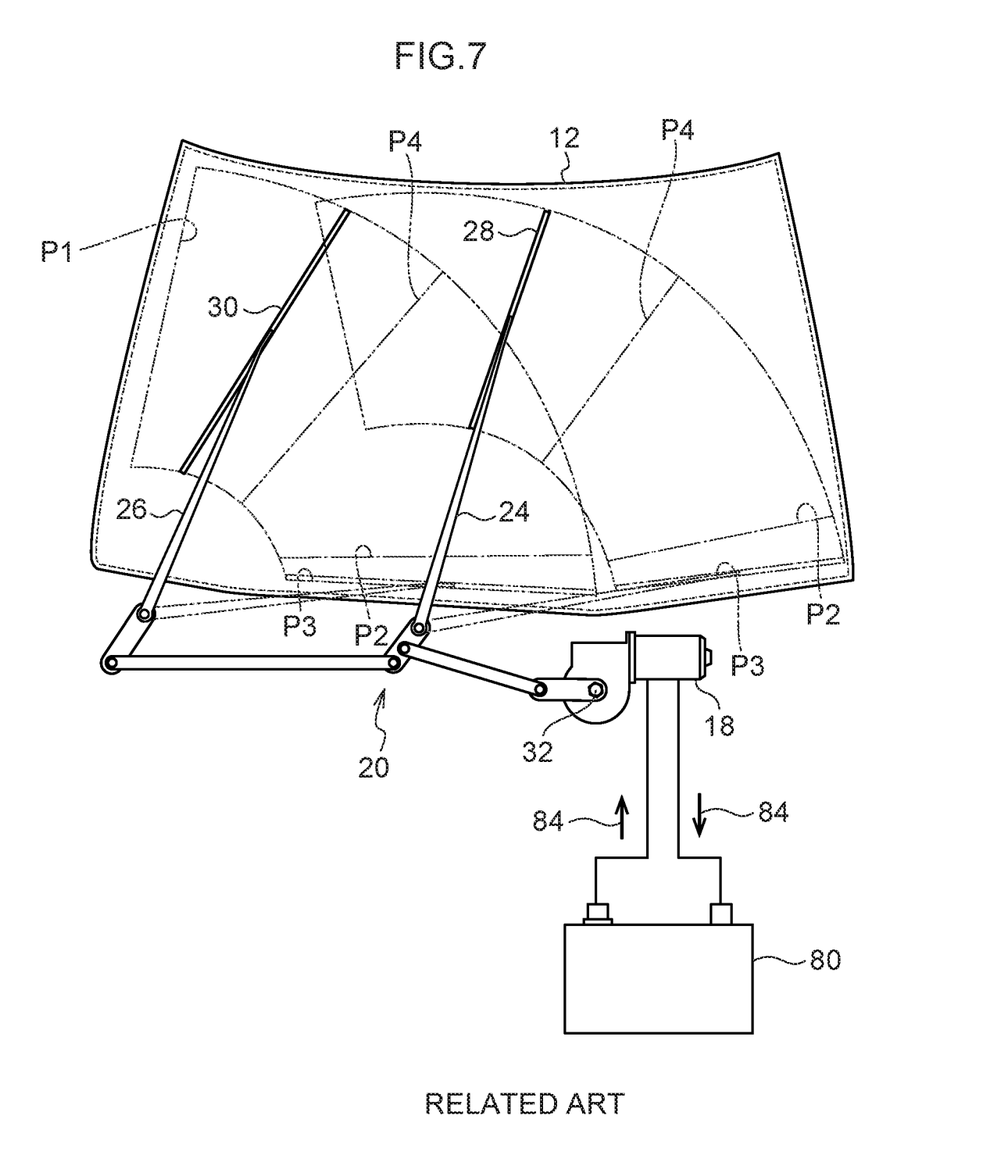
FIG. 7 is a schematic diagram illustrating an example of a return-controlled wiper device.

In return-controlled wiper devices, a wiper motor is rotated forward and in reverse so as to cause a wiper blade to perform a to-and-fro wiping action between preset return positions. FIG. 7 is a schematic diagram illustrating an example of a return-controlled wiper device. In the wiper device illustrated in FIG. 7, an output shaft 32 of a wiper motor 18 is rotated by power 84 supplied from a battery 80, and rotation of the output shaft 32 is transmitted to wiper arms 24, 26 through a link mechanism 20 so as to cause wiper blades 28, 30 to perform a wiping action.

Figure 8A:
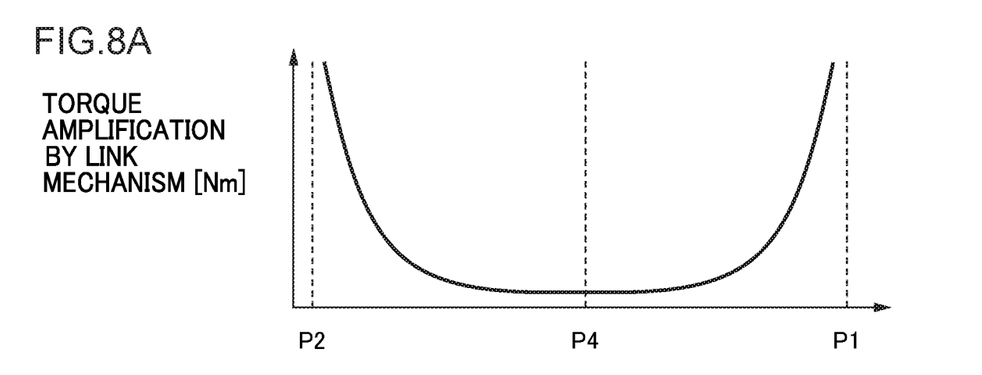
FIG. 8A is a schematic diagram illustrating an example of torque amplification by a link mechanism.
Figure 8B:
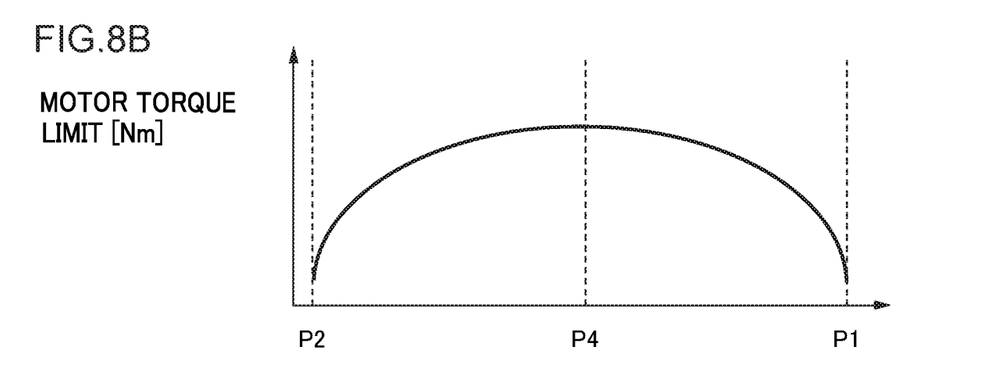
FIG. 8B is a schematic diagram illustrating an example of torque limits of a wiper motor.
Figure 8C:
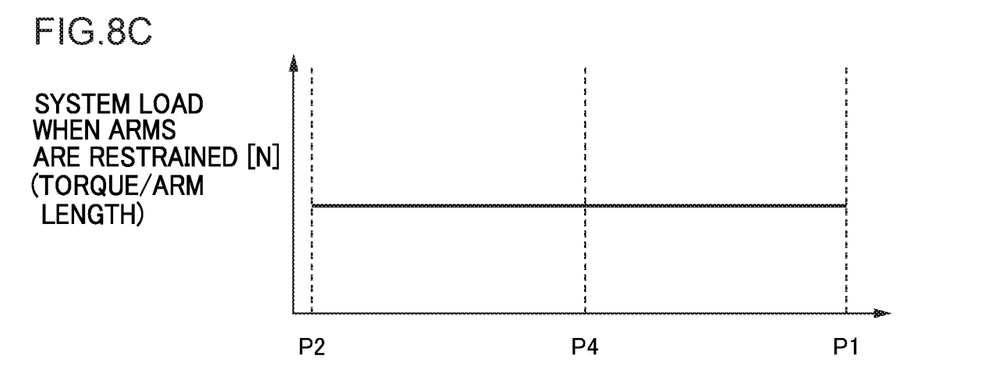
FIG. 8C is a schematic diagram illustrating load on a wiper device when wiper arms are restrained.

The link mechanism 20 functions as a form of lever. FIG. 8A is a schematic diagram illustrating an example of torque amplification by the link mechanism 20. The torque amplification by the link mechanism 20 is large when the wiper blades 28, 30 are positioned in the vicinity of an upper return position P1 or a lower return position P2, and is smallest when the wiper blades 28, 30 are in the vicinity of an intermediate position P4 between the upper return position P1 and the lower return position P2. Thus, due to a limit value of the torque (limit torque) of the output shaft 32 of the wiper motor 18 changing in an upward-bulging curved shape so as to be largest in the vicinity of the intermediate position P4 as illustrated in FIG. 8B, load acting on the wiper arms 24, 26, and in particular load when the wiping action of the wiper blades 28, 30 is impeded by an obstruction or the like present on the surface of the windshield glass (windshield), can be kept constant between the upper return position P1 and the lower return position P2, as illustrated in FIG. 8C. Various methods may be considered for controlling the rotation of the wiper motor 18. If focusing on torque of the output shaft 32, an upper limit (limit) of the torque of the output shaft 32 of the wiper motor 18 of a wiper device including the link mechanism 20 is sometimes set as in the curved line illustrated in FIG. 8B.

The lower the torque limit of the output shaft 32 of the wiper motor 18 illustrated in FIG. 8B, the lower the load on the wiper device configuration, in particular the wiper motor 18. However, if the torque limit of the output shaft 32 is too low, an issue arises in which the wiping action of the wiper blades 28, 30 is affected by the action of external forces from travel-induced airflow or the like, causing the wiping action to become erratic.

Japanese National-Phase Publication No. 2005-502545 discloses a wiper device in which torque of an output shaft of a wiper motor is changed according to a rotation angle of a crank coupled to the output shaft, this rotation angle corresponding to the position of wiper blades 28, 30.

However, the wiper device described in Japanese National-Phase Publication No. 2005-502545 does not take into consideration the effects of external forces due to vehicle travel-induced airflow or the like, and so the torque of the output shaft of the wiper motor might not be controlled appropriately if the wiper device were to be employed in an actual vehicle.

SUMMARY

An aspect of the present disclosure is a wiper control device that includes: a drive circuit that drives a wiper motor so as to cause a wiper blade to perform a wiping action; a rotation angle detection section that detects a rotation angle of an output shaft of the wiper motor; a storage section that stores a base limit torque of the output shaft, which corresponds to a rotation angle of the output shaft; a current detection section that detects a flow of current through a coil of the wiper motor; an environmental information acquisition section that acquires a vehicle speed or a vehicle external air temperature as environmental information; and a control section that controls the drive circuit such that a torque of the output shaft that is estimated from the current detected by the current detection section becomes equal to or less than the base limit torque that corresponds to a rotation angle detected by the rotation angle detection section, and such that a torque of the output shaft becomes equal to or less than a base limit torque that is corrected according to environmental information acquired by the environmental information acquisition section.

DETAILED DESCRIPTION

Figure 1:
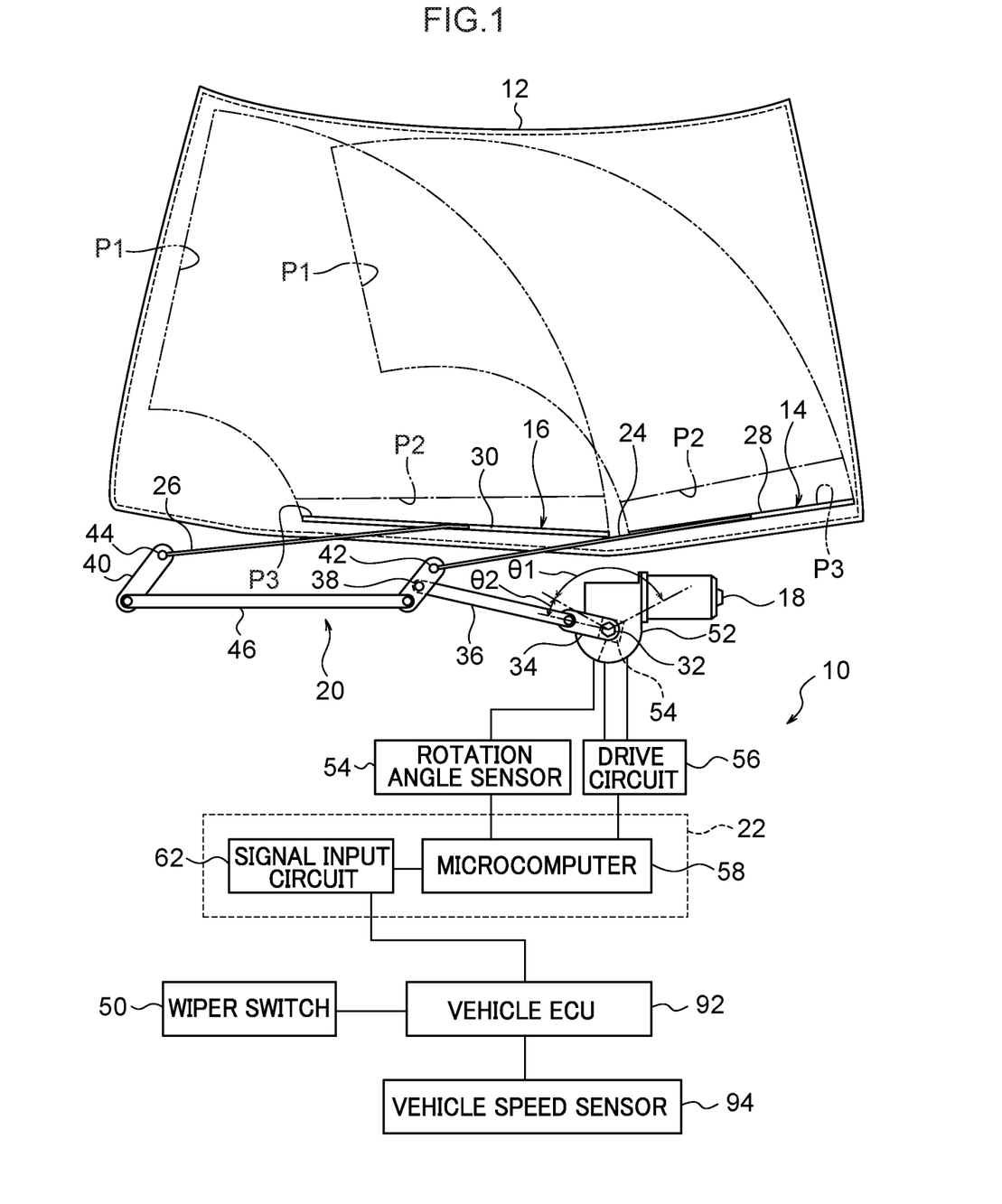
FIG. 1 is a schematic diagram illustrating a configuration of a wiper device according to an exemplary embodiment.

FIG. 1 is a schematic diagram illustrating a configuration of a wiper device 100 according to an exemplary embodiment of the present disclosure. The wiper device 100 is, for example, a device for wiping a windshield glass 12 installed to a vehicle such as a passenger car. The wiper device 100 includes a pair of wipers 14, 16, a wiper motor 18, and a link mechanism 20.

The wipers 14, 16 are configured by respective wiper arms 24, 26 and wiper blades 28, 30. Base end portions of the wiper arms 24, 26 are respectively fixed to pivot shafts 42, 44, described later. The wiper blades 28, 30 are fixed to leading end portions of the wiper arms 24, 26.

In the wipers 14, 16, the wiper blades 28, 30 perform a to-and-fro journey over the windshield glass 12 accompanying operation of the wiper arms 24, 26, such that the wiper blades 28, 30 wipe the windshield glass 12.

The wiper motor 18 includes an output shaft 32 coupled through a speed reduction mechanism 52 configured mainly by a worm gear. The output shaft 32 is capable of rotating in forward and reverse directions. The link mechanism 20 includes a crank arm 34, a first link rod 36, a pair of pivot levers 38, 40, the pair of pivot shafts 42, 44, and a second link rod 46.

One end side of the crank arm 34 is fixed to the output shaft 32, and the other end side of the crank arm 34 is operably coupled to one end side of the first link rod 36. The other end side of the first link rod 36 is operably coupled to the pivot lever 38 at a location nearer to the other end of the pivot lever 38 than the end where the pivot shaft 42 is located. The two ends of the second link rod 46 are operably coupled to the pivot lever 38 at the other end of the pivot lever 38 to the end where the pivot shaft 42 is located, and to the pivot lever 40 at the end of the pivot lever 40 corresponding to the same end of the pivot lever 38.

The pivot shafts 42, 44 are operably supported by pivot holders provided on the vehicle body. The wiper arms 24, 26 are fixed, via the pivot shafts 42, 44, to the ends of the pivot levers 38, 40 where the pivot shafts 42, 44 are located.

In the wiper device 100 according to the present exemplary embodiment, when the output shaft 32 is rotated forward and then in reverse through a rotation angle $\theta 1$ within a predetermined range, rotation force of the output shaft 32 is transmitted to the wiper arms 24, 26 through the link mechanism 20, and the wiper blades 28, 30 perform a to-and-fro journey over the windshield glass 12 between a lower return position P2 and an upper return position P1 accompanying the to-and-fro journey of the wiper arms 24, 26. Various values may be employed as the value of $\theta 1$ according to the configuration of the link mechanism of the wiper device 100 and the like, and in the present exemplary embodiment $\theta 1$ is, for example, 110°.

As illustrated in FIG. 1, in the wiper device 100 according to the present exemplary embodiment, a configuration is adopted in which the crank arm 34 and the first link rod 36 form a straight line shape when the wiper blades 28, 30 are positioned at a stowed position P3.

The stowed position P3 is provided below the lower return position P2. The wiper blades 28, 30 are operated to the stowed position P3 by rotating the output shaft 32 by $\theta 2$ from a state in which the wiper blades 28, 30 are at the lower return position P2. Various values may be employed as the value of the rotation angle $\theta 2$ according to the configuration of the link mechanism of the wiper device 100 and the like, and in the present exemplary embodiment the rotation angle $\theta 2$ is, for example, 10°.

Note that in cases in which the lower return position P2 and the stowed position P3 are aligned with each other, the rotation angle $\theta 2$ is "0" and the wiper blades 28, 30 are stopped and stowed at the lower return position P2.

A wiper motor control circuit 22 for controlling rotation of the wiper motor 18 is connected to the wiper motor 18. The wiper motor control circuit 22 according to the present exemplary embodiment includes a microcomputer 58. The wiper motor control circuit 22, a drive circuit 56, and so on configure a wiper control device 10.

The microcomputer 58 of the wiper motor control circuit 22 controls the rotation speed of the wiper motor 18 based the detection result of a rotation angle sensor 54 for detecting the rotation speed and the rotation angle of the output shaft 32 of the wiper motor 18. The rotation angle sensor 54 is provided inside the speed reduction mechanism 52 of the wiper motor 18, and detects by converting a magnetic field (magnetic force) of a sensor magnet that rotates coupled to the output shaft 32 into a current.

Since the wiper motor 18 according to the present exemplary embodiment includes the speed reduction mechanism 52, as mentioned above, the rotation speed and rotation angle of the output shaft 32 are not the same as the rotation speed and rotation angle of a wiper motor main body. However, in the present exemplary embodiment the wiper motor main body and the speed reduction mechanism 52 are configured as a single inseparable unit, and so hereinafter the rotation speed and rotation angle of the output shaft 32 are taken as being synonymous with the rotation speed and rotation angle of the wiper motor 18.

The microcomputer 58 is able to compute the position of the wiper blades 28, 30 on the windshield glass 12 from the rotation angle of the output shaft 32 detected by the rotation angle sensor 54, and controls the drive circuit 56 so as to change the rotation speed of the output shaft 32 according to this computed position. The drive circuit 56 is a circuit for generating a voltage to be applied to the wiper motor 18 under control of the wiper motor control circuit 22. The drive circuit 56 generates the voltage to be applied to the wiper motor 18 by switching power from a vehicle battery acting as a power source.

A wiper switch 50 is connected to the microcomputer 58 of the wiper motor control circuit 22 through a vehicle electronic control unit (ECU) 92 that controls a vehicle engine and the like. The wiper switch 50 is a switch that switches the supply of power from the vehicle battery to the wiper motor 18 ON or OFF. The wiper switch 50 is capable of being switched to a low speed operation mode selection position (LOW) to operate the wiper blades 28, 30 at low speed, a high speed operation mode selection position (HIGH) to operate the wiper blades 28, 30 at high speed, an intermittent operation mode selection position (INT) to operate the wiper blades 28, 30 intermittently at a fixed cycle, and a stop mode selection position (OFF). A command signal to rotate the wiper motor 18 according to the selection position of each mode is output to the microcomputer 58 through the vehicle ECU 92 and a signal input circuit 62. For example, the wiper motor 18 is rotated at high speed when the wiper switch 50 is in the high speed operation mode selection position, the wiper motor 18 is rotated at low speed when the wiper switch 50 is in the low speed operation mode selection position, and the wiper motor 18 is rotated intermittently when the wiper switch 50 is in the intermittent operation mode selection position.

When the signal output from the wiper switch 50 according to the selection position of the corresponding mode is input to the microcomputer 58 through the vehicle ECU 92 and the signal input circuit 62, the microcomputer 58 performs control according to the command signal from the wiper switch 50. To elaborate, the microcomputer 58 reads a rotation signal of the output shaft 32 and controls the voltage applied to the wiper motor 18 such that the wiper blades 28, 30 are actuated according to the desired to-and-fro wiping cycle based on the command signal from the wiper switch 50.

A vehicle speed sensor 94 that detects the speed of the vehicle is connected to the vehicle ECU 92. Note that communication between the vehicle ECU 92 and the signal input circuit 62 employs a Local Interconnect Network (LIN) protocol as an example.

Figure 2:
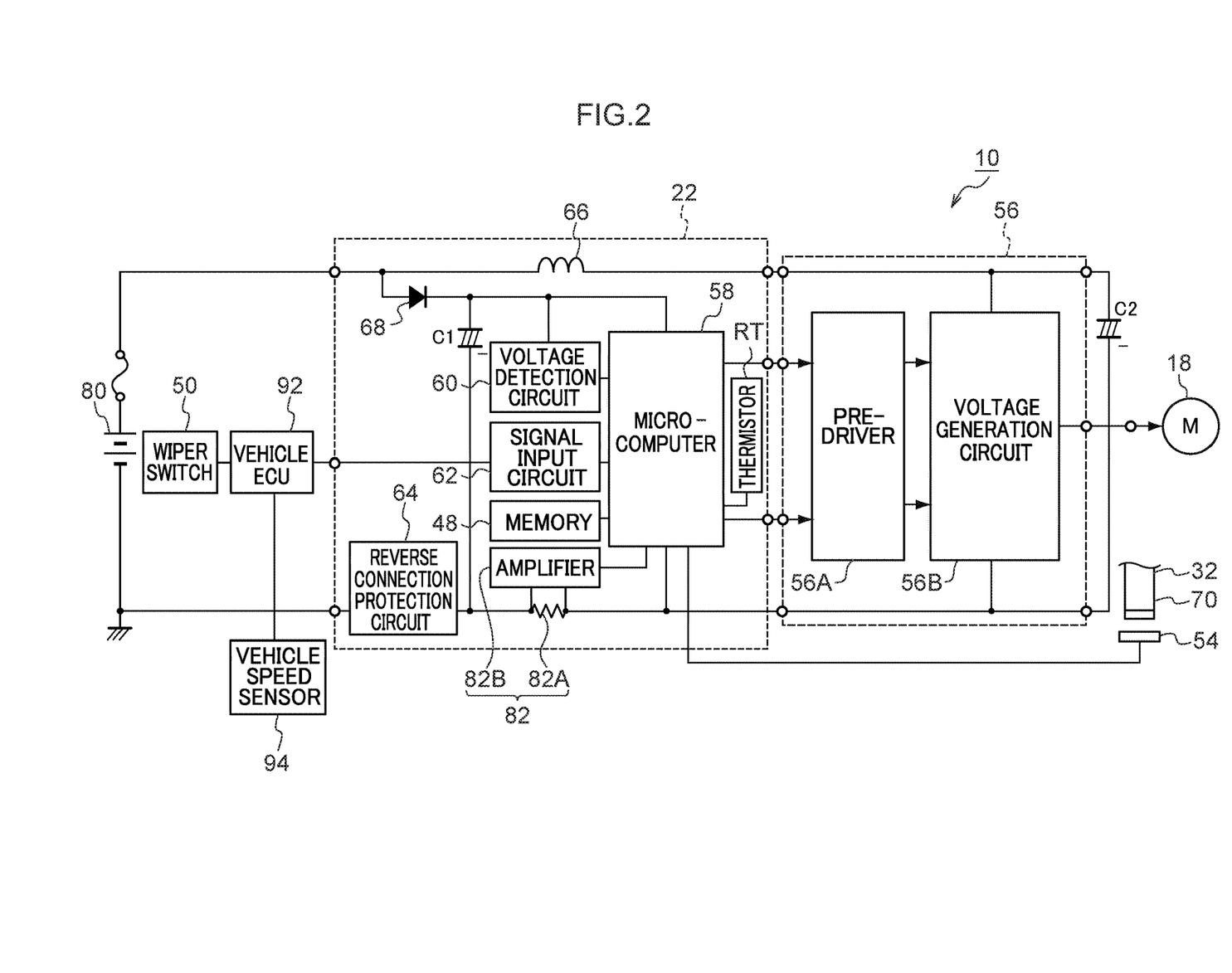
FIG. 2 is a block diagram schematically illustrating an example of a configuration of a wiper control device according to an exemplary embodiment.

FIG. 2 is a block diagram schematically illustrating an example of a configuration of the wiper control device 10 according to the present exemplary embodiment. The wiper control device 10 illustrated in FIG. 2 includes the drive circuit 56 for generating a voltage to be applied to terminals of a coil of the wiper motor 18, and the wiper motor control circuit 22 including the microcomputer 58 for controlling switching elements configuring the drive circuit 56 ON or OFF. Power of a battery 80 is supplied to the microcomputer 58 through a diode 68, and the voltage of the power supplied from the battery 80 is detected by a voltage detection circuit 60 provided between the diode 68 and the microcomputer 58, with the detection result being output to the microcomputer 58. An electrolytic capacitor C1 is also provided, with one terminal of the electrolytic capacitor C1 connected between the diode 68 and the microcomputer 58, and the other terminal (−) grounded. The electrolytic capacitor C1 is a capacitor employed to stabilize the power source of the microcomputer 58. For example, the electrolytic capacitor C1 protects the microcomputer 58 by accumulating sudden high voltages such as surges and discharging to ground.

A signal for instructing the rotation speed of the wiper motor 18 is input from the wiper switch 50 to the microcomputer 58 through the vehicle ECU 92 and the signal input circuit 62. A signal from the vehicle speed sensor 94 is also input to the microcomputer 58 through the vehicle ECU 92 and the signal input circuit 62.

The rotation angle sensor 54 that detects the magnetic field of a sensor magnet 70 as it changes according to rotation of the output shaft 32 is connected to the microcomputer 58. The microcomputer 58 identifies the position of the wiper blades 28, 30 on the windshield glass 12 by computing the rotation angle of the output shaft 32 based on the signal output by the rotation angle sensor 54.

Furthermore, the microcomputer 58 references data in memory 48 of rotation speeds of the wiper motor 18 specified according to positions of the wiper blades 28, 30. The microcomputer 58 then controls the drive circuit 56 such that the rotation of the wiper motor 18 becomes a rotation speed corresponding to the identified position of the wiper blades 28, 30. This data is held in the memory 48 together with data regarding limit torque of the output shaft 32, described later.

The drive circuit 56 includes a pre-driver 56A that generates a drive signal to switch switching elements of a voltage generation circuit 56B ON or OFF based on a control signal for the drive circuit 56 output by the microcomputer 58, and the voltage generation circuit 56B that operates the switching elements according to the drive signal output by the pre-driver 56A and that generates a voltage to be applied to the coil of the wiper motor 18.

In the present exemplary embodiment, a reverse connection protection circuit 64 and a noise prevention coil 66 are provided between the drive circuit 56 and the battery 80 serving as the power source, and an electrolytic capacitor C2 is provided in parallel to the drive circuit 56. The noise prevention coil 66 is an element for suppressing noise generated by switching of the drive circuit 56.

The electrolytic capacitor C2 is an element that alleviates noise generated by the drive circuit 56, and that prevents excessive current from being input to the drive circuit 56 by accumulating sudden high voltages such as surges and discharging to ground.

The reverse connection protection circuit 64 is a circuit for protecting elements configuring the wiper control device 10 if the positive electrode and the negative electrode of the battery 80 are connected in the opposite manner to that illustrated in FIG. 2. As an example, the reverse connection protection circuit 64 is configured by what is referred to as a diode-connected FET in which the drain and the gate of the FET are connected to each other.

A chip thermistor RT that detects a temperature of the substrate as a resistance value is mounted on a substrate of the wiper control device 10 according to the present exemplary embodiment. As an example, the chip thermistor RT employed in the present exemplary embodiment is a Negative Temperature Coefficient (NTC) thermistor in which resistance decreases as the temperature increases. Note that if employed in combination with an inverter circuit, a Positive Temperature Coefficient (PTC) thermistor in which resistance increases as the temperature increases may be employed.

The chip thermistor RT configures a type of voltage divider, and an output terminal of the voltage divider configured by the chip thermistor RT outputs a voltage that changes based on the resistance value of the chip thermistor RT. The microcomputer 58 computes the temperature of the substrate of the wiper control device 10 based on the voltage output from the output terminal of the voltage divider configured by the chip thermistor RT. In cases in which this temperature has exceeded a predetermined threshold temperature, the microcomputer 58 performs processing to stop operation of the wiper control device 10.

A current detection section 82 for detecting a current (motor current) in the coil of the wiper motor 18 and the voltage generation circuit 56B is provided between the respective sources of the switching elements configuring the voltage generation circuit 56B and the battery 80. The current detection section 82 includes a shunt resistor 82A with a resistance value of approximately 0.2 mΩ to several Ω, and an amplifier 82B that detects a potential difference between the two terminals of the shunt resistor 82A that changes according to the current of the voltage generation circuit 56B, and amplifies a signal of the detected potential difference. The microcomputer 58 computes the current value of the motor current based on the signal output from the amplifier 82B, and performs processing to stop generation of voltage by the voltage generation circuit 56B and thereby to stop rotation of the wiper motor 18 in cases in which the current value has exceeded a predetermined threshold value.

Figure 3:
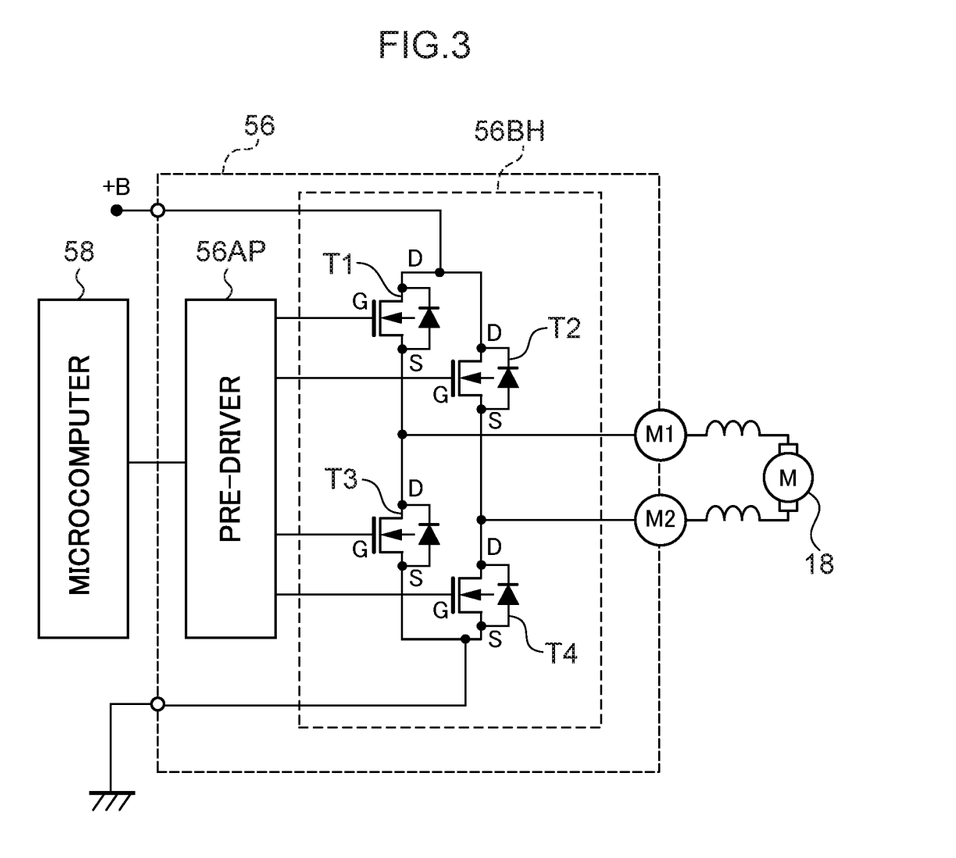
FIG. 3 is a block diagram illustrating an example of a drive circuit in cases in which a wiper motor according to an exemplary embodiment is a brushed motor.

FIG. 3 is a block diagram illustrating an example of the drive circuit 56 in cases in which the wiper motor 18 is a brushed motor. The drive circuit 56 includes a pre-driver 56AP that generates a drive signal to operate switching elements of a voltage generating circuit 56BH and outputs the drive signal to the voltage generating circuit 56BH based on a control signal input by the microcomputer 58, and the voltage generating circuit 56BH that generates power to be supplied to the wiper motor 18 by operating the switching elements based on the drive signal.

As illustrated in FIG. 3, the voltage generating circuit 56BH is an H bridge circuit that employs transistors T1, T2, T3, and T4, which are N-channel field effect transistors (FETs), as switching elements. The drains of the transistor T1 and the transistor T2 are each connected to the positive electrode of a battery, and the sources of the transistor T1 and the transistor T2 are connected to the drains of the transistor T3 and the transistor T4, respectively. The sources of the transistor T3 and the transistor T4 are grounded.

The source of the transistor T1 and the drain of the transistor T3 are connected to one terminal of the coil of the wiper motor 18, and the source of the transistor T2 and the drain of the transistor T4 are connected to the other terminal of the coil of the wiper motor 18.

The transistor T1 and the transistor T4 are switched ON by an H-level drive signal being input to the gates of the transistor T1 and the transistor T4, and a current flows in the wiper motor 18 so as to, for example, operate the wiper blades 28, 30 in a clockwise direction as viewed from inside the vehicle cabin. Furthermore, the voltage of the current can be modulated by using PWM to perform micro ON/OFF control of one out of the transistor T1 and the transistor T4 while the other thereof is being controlled ON.

The transistor T2 and the transistor T3 are switched ON by an H-level drive signal being input to the gates of the transistor T2 and the transistor T3, and a current flows in the wiper motor 18 so as to, for example, operate the wiper blades 28, 30 in a counterclockwise direction as viewed from inside the vehicle cabin. Furthermore, the voltage of the current can be modulated by using PWM to perform micro ON/OFF control of one out of the transistor T2 and the transistor T3 while the other thereof is being controlled ON.

Figure 4:
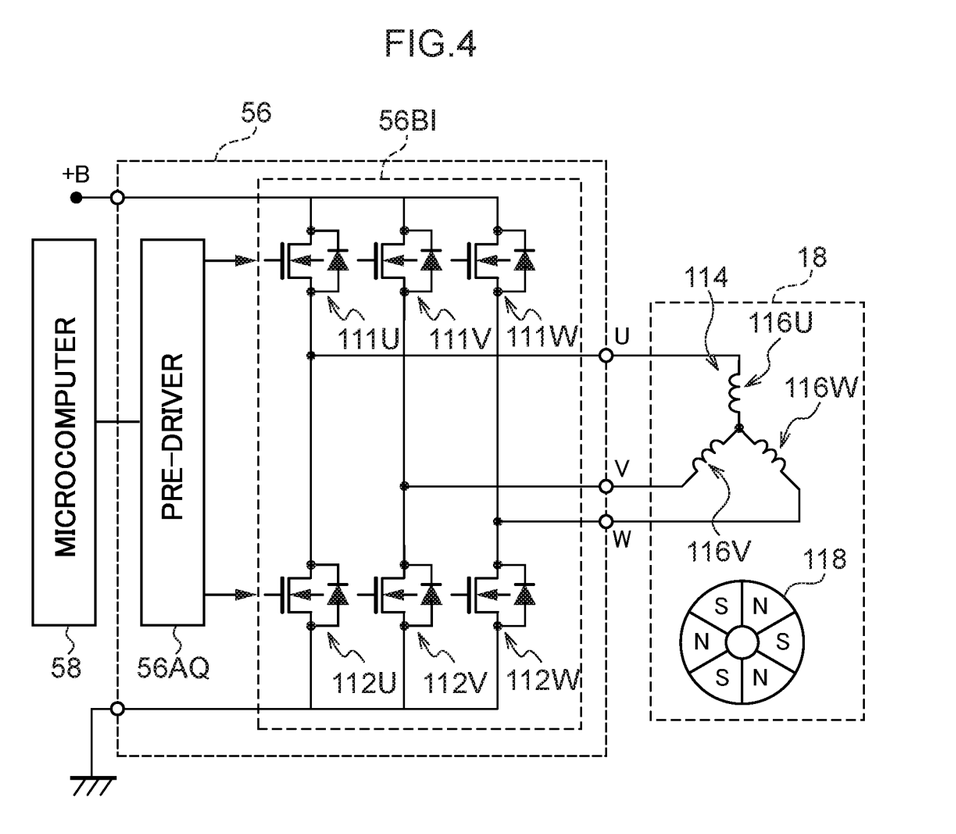
FIG. 4 is a block diagram illustrating an example of a voltage generation circuit in cases in which a wiper motor according to an exemplary embodiment is a brushless motor.

FIG. 4 is a block diagram illustrating an example of the voltage generation circuit 56B in a case in which the wiper motor 18 is a brushless motor. Such a voltage generation circuit 56BI is configured by a three-phase (a U phase, a V phase, and a W phase) inverter.

In cases in which the wiper motor 18 is a brushless motor, rotation control of the wiper motor 18 requires generation of voltages approximating a three-phase alternating current with phases corresponding to the positions of the magnetic poles of permanent magnets of a rotating rotor 118, these voltages being applied to coils 116U, 116V, 116W of a stator 114. The coils 116U, 116V, 116W to which the voltages are applied generate a rotating magnetic field that causes the rotor 118 to rotate, and the rotor 118 rotates according to the rotating magnetic field.

Changes in the magnetic field of a sensor magnet provided to the rotor 118, or to the magnetic poles corresponding to the rotor 118, are detected by a Hall sensor or the like employing Hall elements, and the microcomputer 58 computes the position of the magnetic poles of the rotor 118 from the detected changes in the magnetic field.

A signal for instructing the rotation speed of the wiper motor 18 (rotor 118) is input to the microcomputer 58 from the wiper switch 50 through the vehicle ECU 92. The microcomputer 58 computes the voltage phases to be applied to the coils of the wiper motor 18 based on the positions of the magnetic poles of the rotor 118, generates a control signal to control the voltage generation circuit 56BI based on the computed phases and the rotation speed of the rotor 118 instructed by the wiper switch 50, and outputs this control signal to a pre-driver 56AQ.

The pre-driver 56AQ generates a drive signal to operate the switching elements of the voltage generation circuit 56BI based on the input control signal, and outputs this drive signal to the voltage generation circuit 56BI.

As illustrated in FIG. 4, the voltage generation circuit 56BI includes three N-channel field effect transistors (FETs) 111U, 111V, 111W (referred to hereafter as FETs 111U, 111V, 111W), serving as upper tier switching elements, and three N-channel field effect transistors 112U, 112V, 112W (referred to hereafter as FETs 112U, 112V, 112W), serving as lower tier switching elements. Note that the FETs 111U, 111V, 111W and the FETs 112U, 112V, 112W are referred to collectively as the FETs 111 and the FETs 112 when there is no need to distinguish between them individually, and are suffixed with U, V, or W when there is a need to distinguish between them individually.

Of the FETs 111 and the FETs 112, the source of the FET 111U and the drain of the FET 112U are connected to a terminal of the coil 116U, the source of the FET 111V and the drain of the FET 112V are connected to a terminal of the coil 116y, and the source of the FET 111W and the drain of the FET 112W are connected to a terminal of the coil 116W.

The gates of the FETs 111 and the FETs 112 are connected to the pre-driver 56AQ and are input with a drive signal. When an H-level drive signal is input to the gates of the FETs 111 and the FETs 112, the FETs 111 and the FETs 112 are switched to an ON state in which current flows from the drains to the sources. When an L-level drive signal is input to the gates, the FETs 111 and the FETs 112 are switched to an OFF state in which current does not flow from the drains to the sources.

A voltage that causes the rotor 118 to rotate at the rotation speed instructed by the wiper switch 50, and that changes according to the positions of the magnetic poles of the rotor 118, is generated using PWM to switch the respective FETs 111, 112 of the voltage generation circuit 56BI ON or OFF according to the drive signal.

Figure 5:
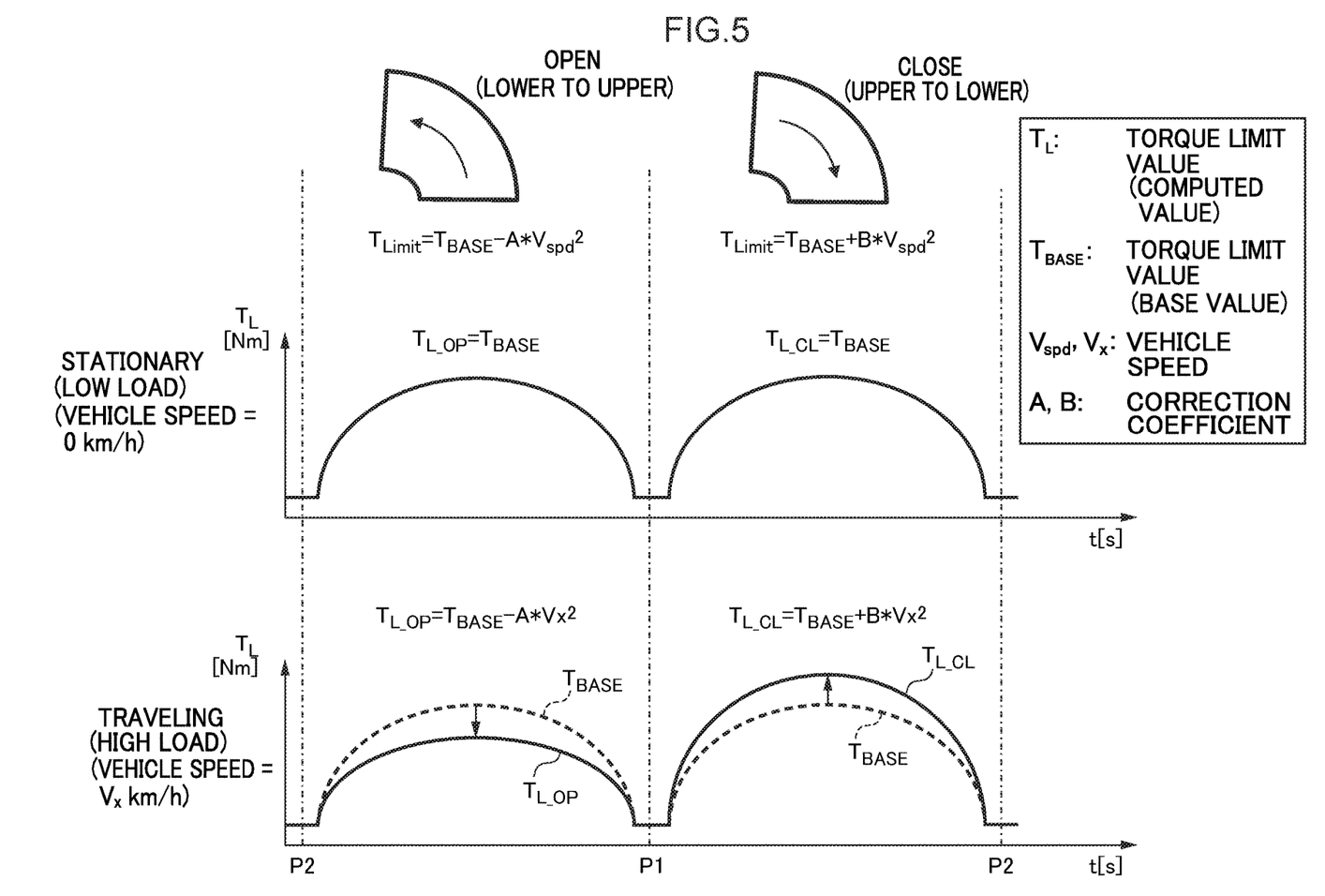
FIG. 5 is an explanatory diagram illustrating an example of torque limits of an output shaft according to vehicle speed and wiping action direction in a wiper control device according to an exemplary embodiment.

FIG. 5 is an explanatory diagram illustrating an example of torque limits of the output shaft 32 according to vehicle speed and wiping action direction in the wiper control device 10 according to the present exemplary embodiment. In the present exemplary embodiment, the limit torque of the output shaft 32 changes according to the vehicle speed detected by the vehicle speed sensor 94 and the wiping action direction. In the present exemplary embodiment, a base limit torque $T_{BASE}$ is set as a base, and the value of the base limit torque $T_{BASE}$ is added to or subtracted from based on a vehicle speed $V_{spd}$ and the wiping action direction to compute a limit torque $T_{Limit}$.

For example, in cases in which the wiping action direction is from the lower return position P2 toward the upper return position P1 in what is referred to as an OPEN action, a limit torque $T_{L\_OP}$ is computed using Equation (1) below, which includes a positive correction coefficient A.

$$T_{L\_OP} = T_{BASE} \times A \times V_{spd}^2 \qquad (1)$$

Moreover, for example in cases in which the wiping action direction is from the upper return position P1 toward the lower return position P2 in what is referred to as a CLOSE action, a limit torque $T_{L\_CL}$ is computed using Equation (2) below, which includes a positive correction coefficient B.

$$T_{L\_CL} = T_{BASE} + B \times V_{spd}^2 \qquad (2)$$

In the present exemplary embodiment, when the wiper device 100 is performing an OPEN action, the wiper blades 28, 30 are pushed upward toward the upper return position P1 by travel-induced airflow, and so the limit torque $T_{L\_OP}$ is smaller than the base limit torque $T_{BASE}$. When the wiper device 100 is performing a CLOSE action, the wiper blades 28, 30 move toward the lower return position P2 against the travel-induced airflow, and so the limit torque $T_{L\_CL}$ is greater than the base limit torque $T_{BASE}$.

The upper part of FIG. 5 illustrates an example of torque limit of the output shaft 32 when the vehicle is stationary (when the vehicle speed is 0 km/h). As illustrated in the upper section of FIG. 5, when the vehicle is stationary, $V_{spd}=0$, and so both the limit torque $T_{L\_OP}$ and the limit torque $T_{L\_CL}$ are equivalent to the base limit torque $T_{BASE}$.

The lower part of FIG. 5 illustrates an example of torque limit of the output shaft 32 when traveling (when the vehicle speed is $V_x$ km/h). For the OPEN action, the limit torque $T_{L\_OP}$ is computed using Equation (3) below, in which the vehicle speed $V_x$ is substituted into Equation (1) above.

$$T_{L\_OP} = T_{BASE} - A \times V_x^2 \qquad (3)$$

The correction coefficient A is a positive value, and so the limit torque $T_{L\_OP}$ computed using Equation (3) is smaller than the base limit torque $T_{BASE}$.

For the CLOSE action, the limit torque $T_{L\_CL}$ is computed using Equation (4) below, in which the vehicle speed $V_x$ is substituted into Equation (2) above.

$$T_{L\_CL} = T_{BASE} + B \times V_x^2 \qquad (4)$$

The correction coefficient B is a positive value, and so the limit torque $T_{L\_CL}$ computed using Equation (4) is greater than the base limit torque $T_{BASE}$.

As illustrated in FIG. 5, in the present exemplary embodiment, the limit torques $T_{L\_OP}$, $T_{L\_CL}$ of the output shaft 32 are computed according to the vehicle speed and the wiping action direction, serving as environmental information, and the microcomputer 58 controls the PWM duty ratio in order to generate and supply a voltage to the wiper motor 18 such that the torque of the output shaft 32 becomes the corresponding limit torque $T_{L\_OP}$, $T_{L\_CL}$ or less. Note that the limit torques $T_{L\_OP}$, $T_{L\_CL}$ of the output shaft 32 may be computed in advance according to vehicle speed and stored in the memory 48.

If the limit torques $T_{L\_OP}$, $T_{L\_CL}$ of the output shaft 32 were constant irrespective of the environmental information, the wiper motor 18 and the drive circuit 56 would need to be rated to amply accommodate the limit torque $T_{L\_CL}$ at the highest load (for example during the CLOSE action when traveling at high speed), and so the wiper motor 18 and the drive circuit 56 would increase in size, power consumption would increase, and the product manufacturing cost would rise. In contrast thereto, in the present exemplary embodiment, by changing the limit torques $T_{L\_OP}$, $T_{L\_CL}$ according to the environmental information, if the highest load occurs infrequently, the limit torque $T_{L\_CL}$ corresponding to the highest load can be set as the upper achievable limit of the limit torque $T_{Limit}$. This enables the rating of the wiper motor 18 and the drive circuit 56 to be lowered in comparison to cases in which the limit torque $T_{Limit}$ remains unchanged regardless of the environmental information. This enables a reduction in cost, and a reduction in power consumption by the wiper device 100.

In FIG. 5, vehicle speed is employed as the environmental information. However, separately to vehicle speed, an external air temperature acquired by an external air temperature sensor of the vehicle may be employed as the environmental information and the limit torque $T_{Limit}$ may be set according to the external air temperature. The load on the wiper motor 18 might increase when the external air temperature is low, for example, due to snow accumulating or freezing occurring on the windshield glass 12, and so the limit torque $T_{Limit}$ is set greater in cases in which the external air temperature detected by the external air temperature sensor is a predetermined threshold value or lower, than in cases in which the detected external air temperature exceeds the predetermined threshold temperature.

Determination as to whether or not the torque of the output shaft 32 is the limit torque $T_{L\_OP}$, $T_{L\_CL}$ or less may be made by, for example, providing a torque sensor to the output shaft 32, selecting a PWM duty ratio that will cause the torque detected by the torque sensor to become the limit torque $T_{L\_OP}$, $T_{L\_CL}$ or less, and controlling the drive circuit 56 such that voltage is generated at this duty ratio. However, since there is a proportional relationship between the torque of the output shaft 32 and the motor current detected by the current detection section 82, in the present exemplary embodiment, the torque of the output shaft 32 is controlled based on the motor current detected by the current detection section 82.

Figure 6:
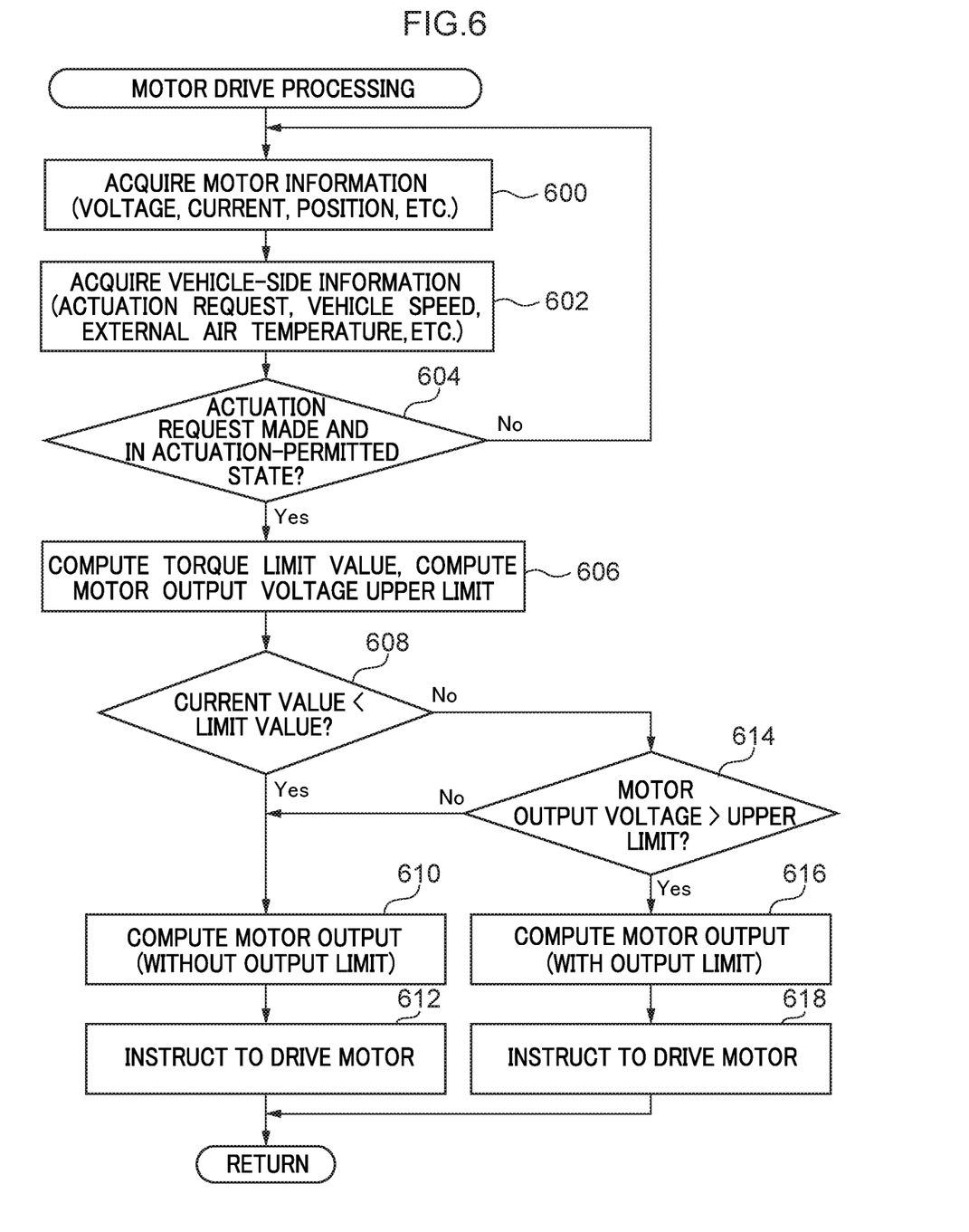
FIG. 6 is a flowchart illustrating an example of motor drive control of a wiper control device according to an exemplary embodiment.

FIG. 6 is a flowchart illustrating an example of motor drive control of the wiper control device 10 according to the present exemplary embodiment. At step 600, motor information such as the power source voltage, the motor current, the position of the wiper blades 28, 30 on the windshield glass 12, and the wiping action direction are acquired. The power source voltage is detected by the voltage detection circuit 60, and the motor current is detected by the current detection section 82. The position of the wiper blades 28, 30 on the windshield glass 12 and the wiping action direction are computed from the rotation angle of the output shaft 32 detected by the rotation angle sensor 54.

At step 602, an actuation request based on operation of the wiper switch 50, vehicle speed information from the vehicle speed sensor 94, and vehicle-side information such as the external air temperature are acquired.

At step 604, determination is made as to whether or not an actuation request has been made, and whether or not the wiper device 100 is in an actuation-permitted state in which operation is possible. For example, an actuation-permitted state of the wiper device 100 is a state in which the wiper device 100 is not overloaded, and no faults or the like are present.

In cases in which an actuation request has been made and the wiper device 100 is in an actuation-permitted state at step 604, processing transitions to step 606. In cases in which no actuation request has been made, or the wiper device 100 is not in an actuation-permitted state at step 604, processing returns to step 600.

At step 606, as illustrated in FIG. 5, the torque limit value (limit torque $T_{Limit}$) is computed, and the upper limit value of the motor output voltage is computed based on the computed torque limit value. The upper limit value of the motor output voltage is, for example, an upper limit value of the voltage supplied to the wiper motor 18 by the drive circuit 56.

At step 608, determination is made as to whether or not the motor current detected by the current detection section 82 is less than the limit value of the wiper device 100. In cases in which the motor current is less than the limit value, at step 610, the duty ratio of the voltage to be output to the motor based on the actuation request is computed. Since the wiper device 100 is not in an overloaded state at step 610, in principle the duty ratio is computed as per the actuation request.

At step 612, the drive circuit 56 is controlled to generate the voltage to be supplied to the wiper motor 18 at the computed duty ratio, and the processing then returns.

In cases in which the motor current is the limit value or greater at step 608, determination is made at step 614 as to whether or not the motor output voltage based on the actuation request has exceeded the upper limit value. In cases in which the motor output voltage is the upper limit value or less, processing transitions to step 610, and in cases in which the upper limit value has been exceeded, processing transitions to step 616.

At step 616, the duty ratio of the voltage to be output to the motor based on the actuation request is computed. Since the wiper device 100 is in an overloaded state at step 616, in principle a lower duty ratio than the duty ratio in the actuation request is selected. The degree by which the duty ratio is lowered compared to when the wiper device 100 is not in an overloaded state differs according to the specifications of the wiper control device 10, the wiper motor 18, and the drive circuit 56, and so is ultimately selected after testing using actual equipment and so on.

At step 618, the drive circuit 56 is controlled to generate the voltage to be supplied to the wiper motor 18 at the computed duty ratio, and the processing then returns.

As explained above, in the wiper control device according to the present exemplary embodiment, the limit torque $T_{Limit}$ of the output shaft 32 of the wiper motor 18 is set according to environmental information such as the vehicle speed or the external air temperature, and the duty ratio of the voltage to be supplied to the wiper motor 18 is selected according to the set limit torque $T_{Limit}$. This enables an overloaded state to be avoided and a wiping action by the wiper device 100 to be continued, even if the wiper motor 18 and the drive circuit 56 have lower ratings.

Even supposing the wiper device 100 were to enter an overloaded state, as illustrated by step 616 in FIG. 6, the load on the wiper device 100 is reduced by limiting the output. This enables the wiping action to continue while preventing the device from being damaged by overloading, even if the wiper motor 18 and the drive circuit 56 of the wiper device 100 have a lower rating.

Note that although the return-controlled wiper device 100 is employed in the wiper control device 10 according to the present exemplary embodiment, a wiper device that is not a return-controlled wiper device may be employed, in which wiper blades perform a to-and-fro wiping action between a lower return position and an upper return position each time an output shaft of a wiper motor rotates through 360°.

Also in a wiper device that is not a return-controlled wiper device, torque corresponding to a rotation angle of an output shaft of a wiper motor is detected by a rotation angle sensor that detects a rotation angle of the output shaft, and the duty ratio of a voltage to be supplied to the wiper motor is controlled so as not to exceed the limit torque illustrated in FIG. 5.

An object of the present disclosure is to provide a wiper control device that performs rotation control of a wiper motor while taking into consideration the action of external forces such as travel-induced airflow.

A first aspect of the present disclosure is a wiper control device that includes: a drive circuit that drives a wiper motor so as to cause a wiper blade to perform a wiping action; a rotation angle detection section that detects a rotation angle of an output shaft of the wiper motor; a storage section that stores a base limit torque of the output shaft, which corresponds to a rotation angle of the output shaft; a current detection section that detects a flow of current through a coil of the wiper motor; an environmental information acquisition section that acquires a vehicle speed or a vehicle external air temperature as environmental information; and a control section that controls the drive circuit such that a torque of the output shaft that is estimated from the current detected by the current detection section becomes equal to or less than the base limit torque that corresponds to a rotation angle detected by the rotation angle detection section, and such that a torque of the output shaft becomes equal to or less than a base limit torque that is corrected according to environmental information acquired by the environmental information acquisition section.

In this wiper control device, the limit torque of the output shaft of the wiper motor is corrected in response to external forces such as travel-induced airflow, enabling rotation control of the wiper motor to be performed while taking into consideration the action of such external forces.

A second aspect of the present disclosure is the wiper control device of the first aspect, wherein: in a case in which the environmental information is vehicle speed, and in a case in which the wiper blade performs the wiping action from a lower return position to an upper return position, correction is performed to decrease the base limit torque according to the square of the vehicle speed, and in a case in which the wiper blade performs the wiping action from the upper return position to the lower return position, correction is performed to increase the base limit torque according to the square of the vehicle speed.

In this wiper control device, correction is performed to decrease the base limit torque according to the square of the vehicle speed during a wiping action of the wiper blade from the lower return position toward the upper return position, since the travel-induced airflow creates a tailwind to the wiping action, and correction is performed to increase the base limit torque according to the square of the vehicle speed during a wiping action of the wiper blade from the upper return position toward the lower return position, since the travel-induced airflow creates a headwind. This enables rotation control of the wiper motor to be performed while taking into consideration the action of external forces such as travel-induced airflow.

A third aspect of the present disclosure is the wiper control device of the first aspect, wherein, in a case in which the environmental information is the vehicle external air temperature, and in a case in which the vehicle external air temperature is equal to or less than a predetermined threshold value, correction is performed to increase the base limit torque.

In this wiper control device, the base limit torque is increased when the external air temperature is low and the load on the wiper motor might increase due to snow accumulating or freezing occurring on the windshield glass. This enables rotation control of the wiper motor to be performed while taking into consideration the action of external forces from freezing or snow build-up.

What is claimed is:
1. A wiper control device comprising:
a drive circuit that drives a wiper motor so as to cause a wiper blade to perform a wiping action;
a rotation angle detection section that detects a rotation angle of an output shaft of the wiper motor;
a storage section that stores a base limit torque of the output shaft, which corresponds to a rotation angle of the output shaft;
a current detection section that detects a flow of current through a coil of the wiper motor;
an environmental information acquisition section that acquires a vehicle speed or a vehicle external air temperature as environmental information; and
a control section that controls the drive circuit such that a torque of the output shaft that is estimated from the current detected by the current detection section becomes equal to or less than the base limit torque that corresponds to a rotation angle detected by the rotation angle detection section, and such that a torque of the output shaft becomes equal to or less than a base limit torque that is corrected according to environmental information acquired by the environmental information acquisition section.

2. The wiper control device of claim 1, wherein:
in a case in which the environmental information is vehicle speed, and in a case in which the wiper blade performs the wiping action from a lower return position to an upper return position, correction is performed to decrease the base limit torque according to the square of the vehicle speed, and in a case in which the wiper blade performs the wiping action from the upper return position to the lower return position, correction is performed to increase the base limit torque according to the square of the vehicle speed.

3. The wiper control device of claim 1, wherein, in a case in which the environmental information is the vehicle external air temperature, and in a case in which the vehicle external air temperature is equal to or less than a predetermined threshold value, correction is performed to increase the base limit torque.

\* \* \* \* \*